United States Patent [19]

Jansen

[11] 4,046,615

[45] Sept. 6, 1977

[54] APPARATUS FOR LAMINATING FILM STRIPS TO A TRANSPORT WEB

[75] Inventor: John R. Jansen, Rochester, N.Y.

[73] Assignee: Eastman Kodak Company, Rochester, N.Y.

[21] Appl. No.: 625,740

[22] Filed: Oct. 24, 1975

[51] Int. Cl.² .......................... B65H 17/40; G03B 1/30

[52] U.S. Cl. .................................... 156/544; 156/554; 156/560; 226/74; 226/170; 352/183

[58] Field of Search ......................... 156/519, 543-546, 156/552, 554, 559, 560, 516, 502, 505, 538-539, 513, 547; 198/699, 692, 844; 226/74, 54, 170; 352/27, 80, 183

[56] References Cited

U.S. PATENT DOCUMENTS

| | | | |
|---|---|---|---|
| 2,705,693 | 4/1955 | Dildilian | 156/545 |
| 3,565,728 | 2/1971 | Alton | 156/519 X |
| 3,572,682 | 3/1971 | Leach et al. | 156/552 X |
| 3,767,513 | 10/1973 | Gnage et al. | 156/516 |
| 3,856,604 | 12/1974 | Lukkarinen | 156/519 X |
| 3,939,026 | 2/1976 | Petry, Jr. et al. | 156/545 X |

*Primary Examiner*—Charles E. Van Horn
*Assistant Examiner*—M. G. Wityshyn
*Attorney, Agent, or Firm*—S. W. Grenban

[57] ABSTRACT

Apparatus for laminating film strips to a transport web, the laminating apparatus adaptable to handle film strips of different sizes having different perforation formats. The laminating apparatus comprises a module for positioning a film strip of a particular film size with respect to the transport web. The film strip and the transport web are then advanced through a laminating station where they are laminated together with a tape. The laminating apparatus is designed to interchangeably receive the positioning module. Thus, film strips of different film sizes may be laminated using the disclosed laminating apparatus by interchanging the positioning module to suit the particular film size to be laminated.

7 Claims, 4 Drawing Figures

APPARATUS FOR LAMINATING FILM STRIPS TO A TRANSPORT WEB

BACKGROUND OF THE INVENTION

1. Field of the Invention

The present invention relates to an apparatus for laminating together film strips and a transport web, and more particularly to a laminating apparatus adaptable to handle film strips of different sizes having different perforation formats.

2. Description of the Prior Art

Amateur color print film is usually returned from the photofinisher to a customer in the form of several relatively short film strips, each film strip commonly containing either three or four image-bearing frames. The film is cut into strips for easier handling and more convenient storage by the customer. Often, the customer desires additional prints from the film strips and thus returns the film strips to the photofinisher with instructions as to which frames to print and how many prints of each frame are desired. While the film strips are convenient for the customer, when returned they present a handling problem for the photofinisher. Commonly, the film strips are handled by laminating each strip to a continuous transport web which is then fed to a printer which utilizes the transport web to advance and position the film negatives for printing. Once the film strips are laminated to the transport web, the print making process may be controlled by a computer, with an operator pre-selecting the number and size of the prints to be made from each frame. However, the step of laminating the film strips to the transport web is not as readily automated. The problem of laminating the film strips to the transport web is complicated by the fact that amateur film comes in several different sizes e.g., 110, 126 and 135 (commonly referred to as 35mm film), and different sizes may have a different format for the perforations along the film edges.

If the photofinisher produces a high volume of prints from such film strips, it is generally desirable to automate the lamination step. At present, a different laminating apparatus is used for each film size. Typically, an operator sits at the laminating apparatus over which a transport web is advancing and places the film strips for which the apparatus was designed on a series of registration pins, the pins designed and spaced to engage the perforations along an edge of the film strip. From this point, the lamination process proceeds automatically for that film strip. For example, film size 135 is laminated to the transport web in a laminating apparatus designed for that particular film size and perforation format. Similarly, film sizes 126 and 110 each use a different laminating apparatus to achieve automatic lamination of the film strip to the transport web.

U.S. Pat. No. 3,767,513 describes an apparatus for securing film to a tabbing material, which apparatus employs pin members cooperating with uniformly spaced perforations in the film to position the film relative to the tabbing material prior to securing the film and the tabbing material together. The disclosed apparatus was designed to attach tabbing to film before the film is cut in film strips and returned to the customer. A separate tabbing apparatus of the type disclosed in the patent is required for each film size; no mention is made for handling a plurality of film sizes by the same tabbing apparatus.

SUMMARY OF THE INVENTION

Apparatus is provided in accordance with the present invention whereby film strips of a plurality of sizes may be laminated to a transport web. In a presently preferred embodiment of the invention, the apparatus comprises means for positioning film strips of a particular size relative to the transport web. Means are provided to supply the transport web to the positioning means. The positioning means is interchangeably receivable by the laminating apparatus wherein the relatively positioned film strips and transport web are laminated together. In order to laminate film strips of a different film size to the transport strip, a positioning means suited for that film size is selected and installed in the laminating apparatus.

In a presently preferred embodiment which is suitable for use with film strips and a transport web having perforations therein, the positioning means comprises a laminating module having an endless belt provided with a first and second row of protruding teeth. The first row of teeth are sized and spaced to engage the film perforations in a film strip of a given size. The second row of teeth are sized and spaced to engage the perforations in the transport web. The first and second rows of teeth are relatively spaced from each other so as to cause the edges of the film strips and the transport web to overlap a small amount. A tape, applied by a laminating jig, then laminates the film strips to the transport web. To position a different film size, the laminating module is removed and a different laminating module is substituted having a first row of teeth sized and spaced to match the perforations in that film size.

BRIEF DESCRIPTION OF THE DRAWINGS

In the detailed description of the preferred embodiments of the invention presented below, reference is made to the accompanying drawings, in which.

DETAILED DESCRIPTION OF THE PREFERRED EMBODIMENTS

Because web transporting apparatus are well known, the present description will be directed to elements forming part of, or cooperating more directly with, laminating apparatus in accordance with the present invention. Elements of laminating apparatus not specifically shown or described should be understood to be selectable from those known in the art.

Figure 1:
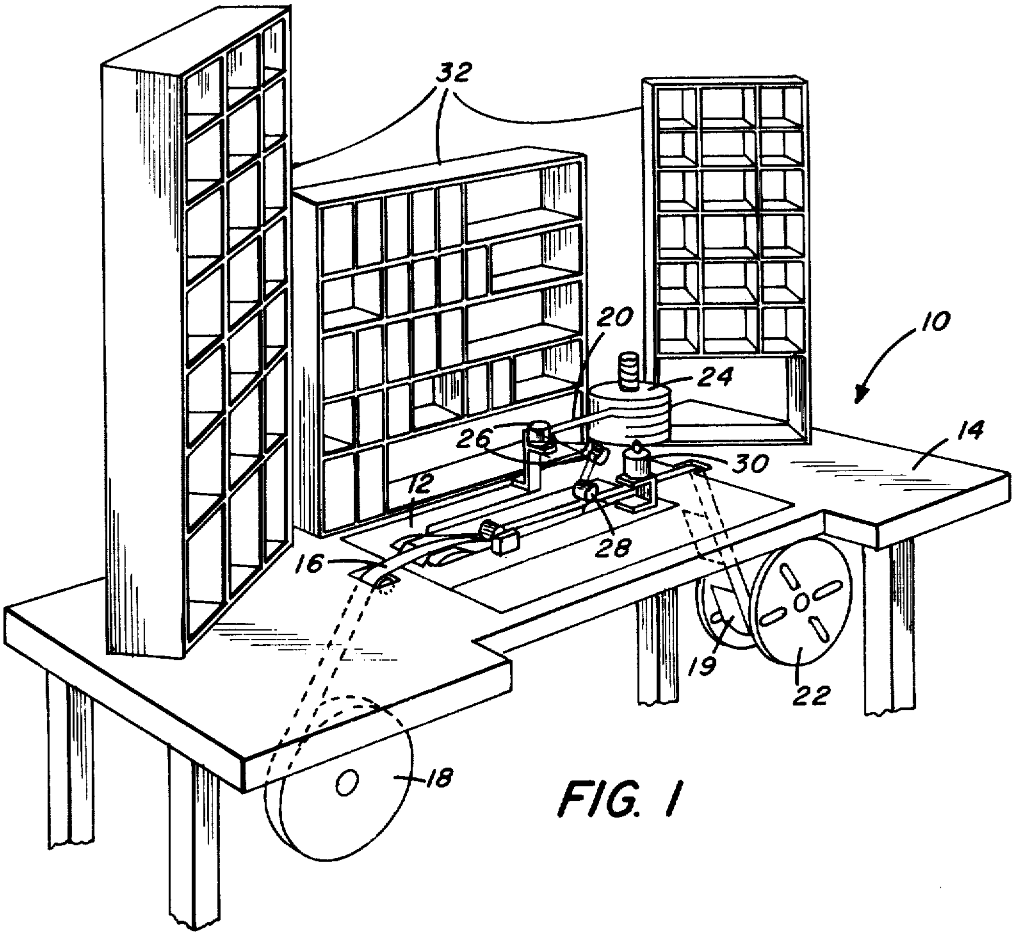
FIG. 1 shows a laminating apparatus in accordance with a preferred embodiment of the invention, adaptable to automatically laminate a plurality of film sizes to a transport web.

FIG. 1 shows a laminating apparatus, generally enumerated 10, in accordance with the present invention. Laminating apparatus 10 comprises two main parts; a laminating module 12, and a work table 14. Laminating module 12 accepts a transport web 16 from a supply roll 18, and laminates film strips 19 to transport web 16 by the application of a pressure sensitive tape 20. (This lamination step is discussed in more detail in connection with FIGS. 2 and 3). Pressure sensitive tape 20 is supplied to laminating module 12 from a supply reel 24. Laminating module 12 is provided with a pair of guide rollers 26 which guide pressure sensitive tape 20 to a laminating roll 28 with the adhesive side of the tape facing web 16. A positioning means described in connection with FIG. 2 positions the web 16 and film strips 19 with complementary edges thereof slightly overlapped. Accordingly, upon transport of web 16, laminating roll 28 applies the pressure sensitive tape 20 to film strips 19 and web 16 for laminating the film strips to the web. After lamination, the transport web 16 and film strips 19 are wrapped onto a take-up reel 22.

In order to separate customer's orders, a solenoid 30 which is electronically activated by an operator, punches a hole in transport web 16 after each customer's order. At a later stage in the print making process, the hole in transport web 16 can be detected, thus allowing the customer's orders to be separated automatically.

Work table 14 is provided with three storage bins 32 for the purposes of storing labels, preprinted price tags, or messages such as "your negatives have scratches."

Figure 2:
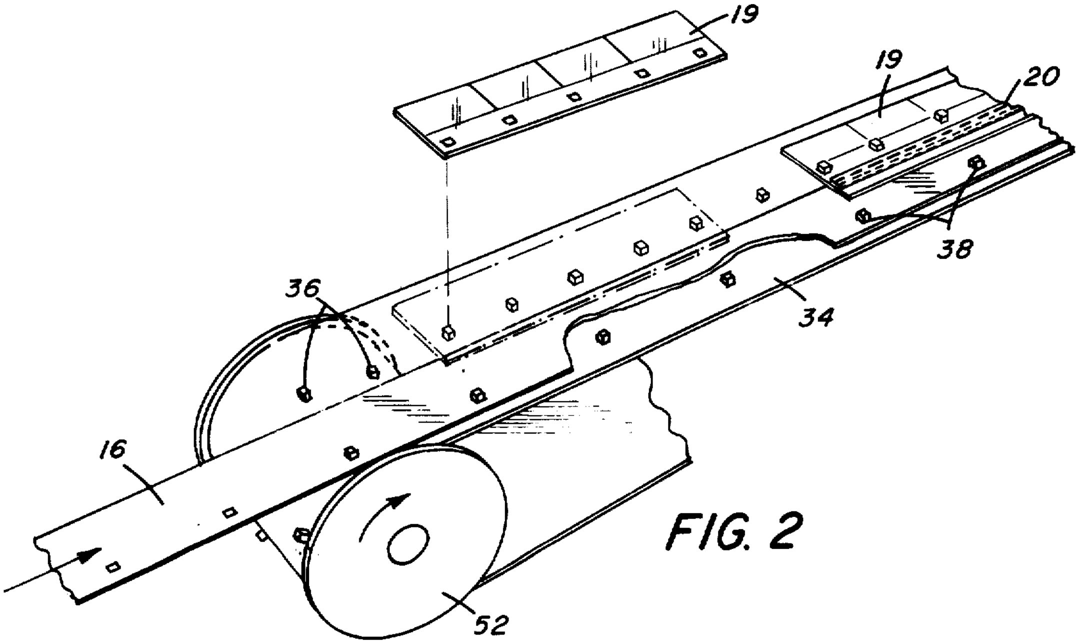
FIG. 2 shows a segmental enlarged perspective view of the positioning apparatus of FIG. 1 for positioning a film strip relative to a transport web for purposes of lamination.

As mentioned, laminating module 12 includes means for positioning film strips 19 relative to transport web 16. One example of such means is shown in FIG. 2. An endless belt 34 is provided with a first and a second row of protruding teeth, 36 and 38 respectively. The first row of protruding teeth 36 are sized and spaced to engage perforations in a film strip 19. The second row of protruding teeth 38 are sized and spaced to engage perforations in transport web 16. The two rows of teeth 36 and 38 are spaced apart so as to allow the edges of film strip 19 and transport web 16 to overlap slightly, as shown in FIG. 2. The partially overlapped film strip 19 and transport web 16 are then laminated together by laminating jig 28 as described above. Although it has been found preferable to slightly overlap complementary edges of the film strip and transport web prior to the laminating operation, satisfactory results are also achieved if the complementary edges are abutted.

Figure 3:
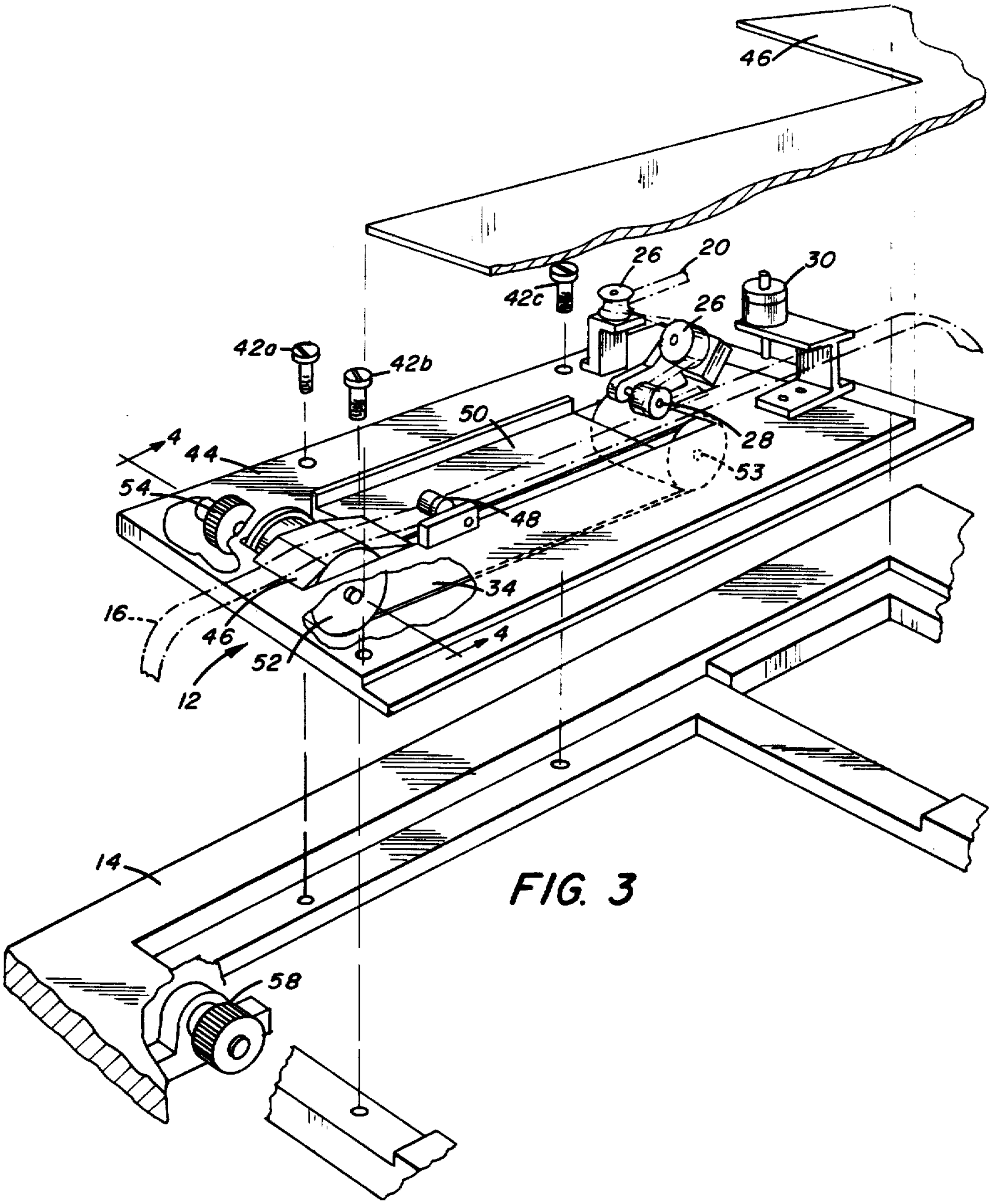
FIG. 3 shows an enlarged exploded view in perspective of a laminating module receivable by the laminating apparatus shown in FIG. 1.
Figure 4:
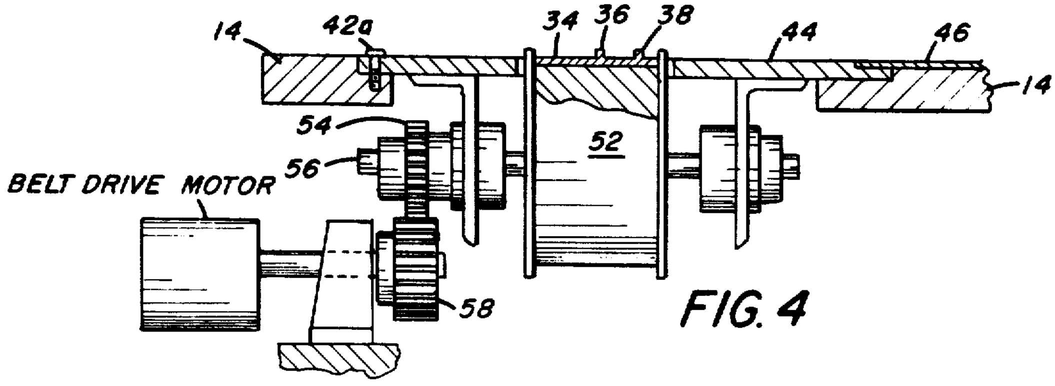
FIG. 4 is a frontal cross-sectional view taken substantially along line 4—4 of FIG. 3 showing how the laminating module is coupled to the laminating apparatus.

FIG. 3 shows an exploded view of laminating apparatus 10 of FIG. 1, showing how laminating module 12 is attached to and received by laminating apparatus 10. As shown in FIGS. 3 and 4, three screws **42*a*, *b* and *c* are provided to attach a laminating module work plate 44 to work table 14. A translucent viewing plate 46 overlaps part of work plate 44 as shown in FIGS. 3 and 4. Viewing plate 46 is not secured to work table 14 but may be readily removed for replacement if it becomes scratched, or when laminating module 12 is being replaced. All that is necessary to replace one laminating module 12 with another module is to remove the three screws 42*a*, *b* and *c* from work table 14, remove translucent viewing plate 46, disconnect the transport punch wire plug, not shown, lift laminating module 12 from work table 14, and install a new module on work table 14. The three screws 42*a*, *b* and *c* are then used to secure the new laminating module to work table 14, and translucent viewing plate 46** is placed back in its position as previously described.

As described in connection with FIG. 2, an endless belt 34 having two rows of teeth 36 and 38 are used to position film strips 19 relative to transport web 16. In order to position a film strip of a different film size, it is required that the first row of perforations 36 on the belt 34 have a different size and different spacings to match the perforations on the different film size. Therefore, if each laminating module 12 is provided with a belt 34 which has a row of teeth 36 suited for a particular film size, then in order to laminate film strips of a different film size using the laminating apparatus 10 shown in FIG. 1, all that is necessary is that a different module 12, i.e., the one that is designed for that particular film size, be installed in laminating apparatus 10. This installation, as previously described, is easily and quickly performed. Thus, the same laminating apparatus 10 may be used for any film size as long as the particular module 12 adapted for that particular film size is installed into laminating apparatus 10. A laminating apparatus 10 which can receive laminating modules 12 interchangeably is highly desirable since a significant savings in costs can be realized through the use of the same drive motors and drive trains (not shown) which advance transport web 16; additionally, the same work table 14 and storage bins 32 can all be used with the various laminating modules 12 to laminate film strips 19 of any size to transport web 16.

Looking in more detail at laminating module 12, as shown in FIG. 3, it is seen that transport web 16, shown in phantom, is guided up over a guide plate 46 and down onto belt 34 by an engagement roller 48. Engagement roller 48 applies pressure on transport web 16 causing perforations in transport web 16 to engage the second row of teeth 38 on belt 34. (The first and second row of protruding teeth 36 and 38 described in connection with FIG. 2 are not shown in FIG. 3 for the sake of clarity.) A metal plate 50 is provided upon which film strips 19 are placed and manually caused to engage the first row of teeth 36 on belt 34. One side of belt 34 is wrapped around a drive roller 52 which, when in operation, causes the film strip 19 and transport web 16 to advance toward a laminating jig 28. The other end of belt 34 is wrapped around guide roller 53. As previously described, laminating jig 28 applies pressure sensitive tape 20 to the slightly overlapped edges of film strip 19 and transport web 16. The film strip 19 and transport web 16 are thus laminated together and advanced past laminating jig 28 onto a take-up reel 22 (FIG. 1). At the end of a customer's order, when the last film strip 19 of that order has passed solenoid 30, solenoid 30 is electronically activated by a button, or other such device (not shown), and a hole is punched in transport web 16. This hole, as previously mentioned, may be used to differentiate between customer's orders.

FIG. 4 shows how drive roller 52, which drives endless belt 34, is itself driven. Drive roller 52 is secured to an axle 56 to which a gear 54 is attached. Gear 54 is driven by a gear 58 which is in turn driven by a belt drive motor. This drive apparatus is part of a laminating apparatus 10 and is not interchanged when each module 12 is replaced. The gear ratios of gears 54 and 58 should be chosen so that the endless belt 34 advances transport web 16 at a speed which is best for laminating without film damage.

The invention has been described in detail with particular reference to preferred embodiments thereof, but it will be understood that variations and modifications can be effected within the spirit and scope of the invention.

What is claimed is:

1. Apparatus for laminating film strips of a plurality of film sizes to a relatively long transport web, said apparatus comprising:

means for supplying the transport web to said apparatus;

interchangeable means for positioning film strips of a particular film size relative to the transport web;

means for selectively receiving one of a possible number of said interchangeable positioning means, thus enabling film strips of the particular film size to be positioned relative to the web by one of said interchangeable positioning means and film strips of another film size to be positioned relative to the web by another of said interchangeable positioning means;

each said interchangeable positioning means comprising a transport belt, means coupled to said transport belt for engaging the film strips and the transport web to establish the relative position therebetween, and means for advancing said transport belt so that the film strips and transport web are advanced in such established relative position for lamination; and, means for laminating the film strips to the transport web in such established relative position.

2. Laminating apparatus for laminating film strips of a plurality of film widths to a transport web which transport web is substantially longer than the film strips, the film strips and the transport web including perforations of known pitch, said apparatus comprising:

first and second interchangeable means for positioning film strips of different film widths relative to the transport web, said first positioning means for positioning film of a first width and said second positioning means for positioning film of a second width;

means for alternately receiving said first and second interchangeable positioning means in said apparatus;

means for supplying the transport web to said positioning means;

each said positioning means comprising a belt having first and second rows of protruding teeth, said first row of teeth sized and spaced to engage the perforations in the film strips, and said second row of teeth sized and spaced to engage the perforations in the transport web, and means for advancing said belt so that the film strips and the transport web are advanced together with said belt;

means for laminating the film strips to the transport web, thus enabling film strips of a plurality of film widths to be laminated by selecting said interchangeable positioning means to match the film width to be laminated.

3. An interchangeable module apparatus for use with a film laminating apparatus adapted to receive said module apparatus, the laminating apparatus including means for supplying a transport web to said module apparatus, said module apparatus comprising:

means for laminating the transport web to film strips;

a belt having first and second rows of protruding teeth, said first row of teeth spaced to engage perforations in the film strip, and said second row of teeth spaced to engage perforations in the transport web; and means for advancing said belt so that the film strips and the transport web attached thereto are advanced with said belt and laminated together.

4. An apparatus as in claim 3 wherein said advancing means comprises a drive roller and said belt is an endless belt, said endless belt wrapped at least partially around said drive roller.

5. An apparatus for use in laminating film strips to a transport web, both the film strips and the transport web having at least one row of perforations, said apparatus comprising:

a belt adapted to be advanced and having first and second rows of protruding teeth, said first row of teeth spaced to engage perforations in the film strips and said second row of teeth spaced to engage perforations in the transport web;

means for supplying the transport web to said belt with the perforations therein receiving said second row of teeth; and means for laminating film strips engaged by said first row of teeth to the transport web.

6. An apparatus as in claim 5 wherein said first and second rows of teeth are relatively spaced to cause complementary edges of the film strips and the transport web engaged thereto to overlap each other.

7. An apparatus as in claim 5 wherein said first and second rows of teeth are relatively spaced to cause complementary edges of the film strips and the transport web engaged thereto to substantially abut with each other.

* * * * *